United States Patent
Wang et al.

(10) Patent No.: US 9,584,384 B2
(45) Date of Patent: *Feb. 28, 2017

(54) METHODS FOR RETRANSMITTING REVERSE LINK DATA AND APPARATUSES USING THE SAME

(71) Applicant: Intel Corporation, Santa Clara, CA (US)

(72) Inventors: Guotong Wang, Beijing (CN); Anthony Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/029,835

(22) Filed: Sep. 18, 2013

(65) Prior Publication Data

US 2014/0078883 A1  Mar. 20, 2014

Related U.S. Application Data (60) Provisional application No. 61/703,012, filed on Sep. 19, 2012, provisional application No. 61/713,386, filed on Oct. 12, 2012.

(51) Int. Cl.
*H04L 12/26* (2006.01)
*H04L 1/16* (2006.01)
(Continued)

(52) U.S. Cl.
CPC ........ *H04L 43/0847* (2013.01); *H04L 1/1607* (2013.01); *H04L 1/1874* (2013.01)

(58) Field of Classification Search
CPC .. H04L 1/1607; H04L 43/0847; H04L 1/1809
(Continued)

(56) References Cited

U.S. PATENT DOCUMENTS 7,031,257 B1 *  4/2006  Lu et al. .............. 370/235
7,146,171 B2 * 12/2006  Tang ............... H04L 1/0003
                                                      455/423

(Continued)

FOREIGN PATENT DOCUMENTS

CN    1365553 A    8/2002
CN  101924618 A   12/2010
(Continued)

OTHER PUBLICATIONS

Office Action received for Chinese Patent Application No. 201310429790.0, mailed on Dec. 25, 2015, 10 pages of Chinese Office Action only.

(Continued)

*Primary Examiner* — Mohamed Kamara
*Assistant Examiner* — Will Lin
(74) *Attorney, Agent, or Firm* — Forefront IP Lawgroup of Christie and Rivera, PLLC (57) ABSTRACT

A method for retransmitting reverse link data practiced by a media access control layer, the method comprising: buffering a plurality of data frames encapsulated in a first access probe in a memory; obtaining information regarding data frames encapsulated in the first access probe that are successfully decoded by a telecommunication network; selecting the buffered data frames that are required to be retransmitted, according to the obtained information; and passing down the selected data frames to a physical layer, to encapsulate the selected data frames into a second access probe and transmit the second access probe to the telecommunication network.

20 Claims, 5 Drawing Sheets

(51) Int. Cl.
*H04L 1/18* (2006.01)
*H04L 1/00* (2006.01)

(58) Field of Classification Search
USPC .................................................. 370/216, 230
See application file for complete search history.

(56) References Cited

U.S. PATENT DOCUMENTS

| | | | | |
|---|---|---|---|---|
| 7,301,257 | B2* | 11/2007 | Hwang | H02N 2/025 310/317 |
| 8,223,628 | B2* | 7/2012 | Thyagarajan | 370/216 |
| 2004/0192312 | A1* | 9/2004 | Li | H04L 1/16 455/445 |
| 2006/0133379 | A1* | 6/2006 | Krishnan | H04L 1/16 370/394 |
| 2007/0234170 | A1* | 10/2007 | Shao | H04L 1/1874 714/746 |
| 2008/0212551 | A1* | 9/2008 | Wu | H04L 1/188 370/342 |
| 2009/0213729 | A1* | 8/2009 | Zhang | H04L 1/1607 370/216 |
| 2010/0290437 | A1* | 11/2010 | Wang | H04W 76/026 370/335 |
| 2011/0164609 | A1* | 7/2011 | Lee | H04W 76/026 370/352 |
| 2013/0268820 | A1* | 10/2013 | Sun | H04L 1/08 714/748 |

FOREIGN PATENT DOCUMENTS

| | | |
|---|---|---|
| CN | 102664718 A | 9/2012 |
| KR | 1020090016412 A | 2/2009 |
| WO | 00/49761 A1 | 8/2000 |

OTHER PUBLICATIONS

Office Action received for Chinese Patent Application No. 201310429790.0, mailed on Jul. 21, 2016, 10 Pages.

\* cited by examiner

METHODS FOR RETRANSMITTING REVERSE LINK DATA AND APPARATUSES USING THE SAME

CROSS REFERENCE TO RELATED APPLICATIONS

This application claims the benefit of U.S. Provisional Applications No. 61/703,012 and No. 61/713,386, filed on Sep. 19, 2012 and Oct. 12, 2012, respectively, and the entirety of which is incorporated by reference herein.

BACKGROUND

Technical Field

The present invention relates to data retransmission, and in particular, relates to methods for retransmitting reverse link data and apparatuses using the same.

Description of the Related Art

At the level of interconnected network systems, protocol schemes have been developed to facilitate the exchange of data among multiple elements of the system. A protocol scheme specifies the manner of interpreting every data bit of a data packet exchanged across the networks. In order to simplify network design, several well-known techniques of layering the protocols have been developed. Protocol layering divides the network design into functional layers and then assigns separate protocols to perform each layer's task.

In a data retransmission mechanism, an upper layer is responsible for comprehending information of a SACK (Selective Acknowledgement) order, which indicates which frames have been successfully transmitted to the network, but the lower layer does not have the capability to comprehend the content of a SACK order. The lower layer cannot know which frames have been successfully transmitted to the network through received data after instructing RF (radio frequency) circuits to transmit data via a reverse link frame by frame. It may cause the lower layer to mistakenly instruct the RF hardware to retransmit the frames, which have been successfully transmitted, after receiving a data retransmission command from the upper layer, resulting in the unnecessary occupation of network bandwidth.

Methods for retransmitting reverse link data and apparatuses using the same are needed so as to have the lower layer instruct the RF circuits to retransmit frames that have not been successfully transmitted correctly. Therefore, the unnecessary occupation of network bandwidth may be avoided.

BRIEF SUMMARY

An embodiment of a method for retransmitting reverse link data practiced by a media access control layer, the method comprising: buffering a plurality of data frames encapsulated in a first access probe in a memory; obtaining information regarding data frames encapsulated in the first access probe that are successfully decoded by a telecommunication network; selecting the buffered data frames that are required to be retransmitted, according to the obtained information; and passing down the selected data frames to a physical layer, to encapsulate the selected data frames into a second access probe and transmit the second access probe to the telecommunication network.

An embodiment of an electronic device. The electronic device comprises a radio frequency processing module and a control module. The control module coupled to the radio frequency processing module. The control module configured to execute a method for retransmitting reverse link data practiced by a media access control layer, wherein the method comprises: buffering a plurality of data frames encapsulated in a first access probe in a memory, obtaining information regarding data frames encapsulated in the first access probe that are successfully decoded by a telecommunication network, selecting the buffered data frames that are required to be retransmitted, according to the obtained information, and passing down the selected data frames to a physical layer, to encapsulate the selected data frames into a second access probe and enable the PHY layer to drive the radio frequency processing module to transmit the third access probe to the telecommunication network.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
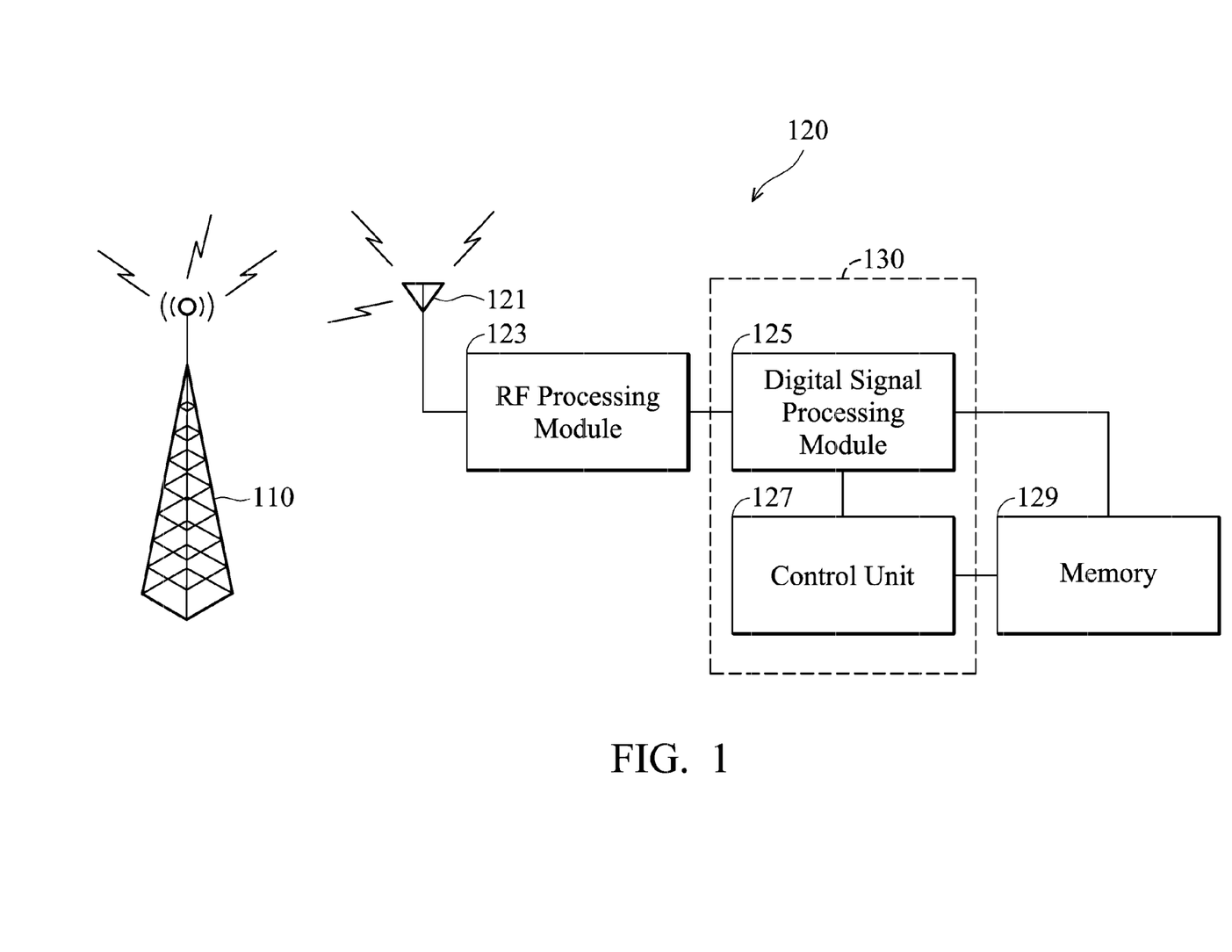
FIG. 1 is a schematic diagram illustrating the architecture of an access network according to an embodiment of the invention.

FIG. 1 is a schematic diagram illustrating the architecture of an access network according to an embodiment of the invention. The access network contains at least a base station 110 and a subscriber device 120. The subscriber device 120 may be a mobile phone, a tablet PC (personal computer), wireless telecommunication network card, or any electronic device having the capability of communicating with the base station 110. Forward link RF (radio frequency) signals transmitted from the base station 110 are received by the antenna 121 and passed to the RF processing module 123. The RF processing module 123 down-converts the signals to baseband and digitizes the baseband signals. The digital signal processing unit 125 processes the digitized baseband signals in accordance with a protocol. The protocol may be a CDMA (code division multiple access)-based or a LTE (Long Term Evolution)-based protocol, or others. The signal processing performed by the digital signal processing unit 125 includes demodulation with the forward link spreading code and channel code, as well as the Viterbi decoding and block de-interleaving, the use of which is well known in the art. This processing is performed on a frame-by-frame basis. The resulting frames of digital data from the digital signal processing unit 125 are passed to the control unit 127. The control unit 127 receives the frames of digital data and determines if the digital data is a signaling message or user data based on header information contained in each frame. The control unit 127 may further configure the digital signal processing unit 125 for the reception of forward link data and the transmission of reverse link data by providing the necessary spreading and channel codes, as well as the generation of outgoing signaling messages that are transmitted to the base station 110. The reverse link data are forwarded along with the outgoing signaling messages to the digital signal processing unit 125 which Viterbi encodes, block interleaves, modulates and spreads the data.

The digital signal processing unit 125 may include a DSP (digital signal processor) controlled by software instructions stored in the memory 120. The control unit 127 may include a microprocessor, when loading and executing software instructions stored in the memory 129, performing methods for retransmitting reverse link data. The digital signal processing unit 125 and/or the control unit 127 may be considered as a control module 130, which drives the RF processing module 123 to receive forward link RF signals from the base station 110 and transmit reverse link RF signals to the base station 110.

Figure 2:
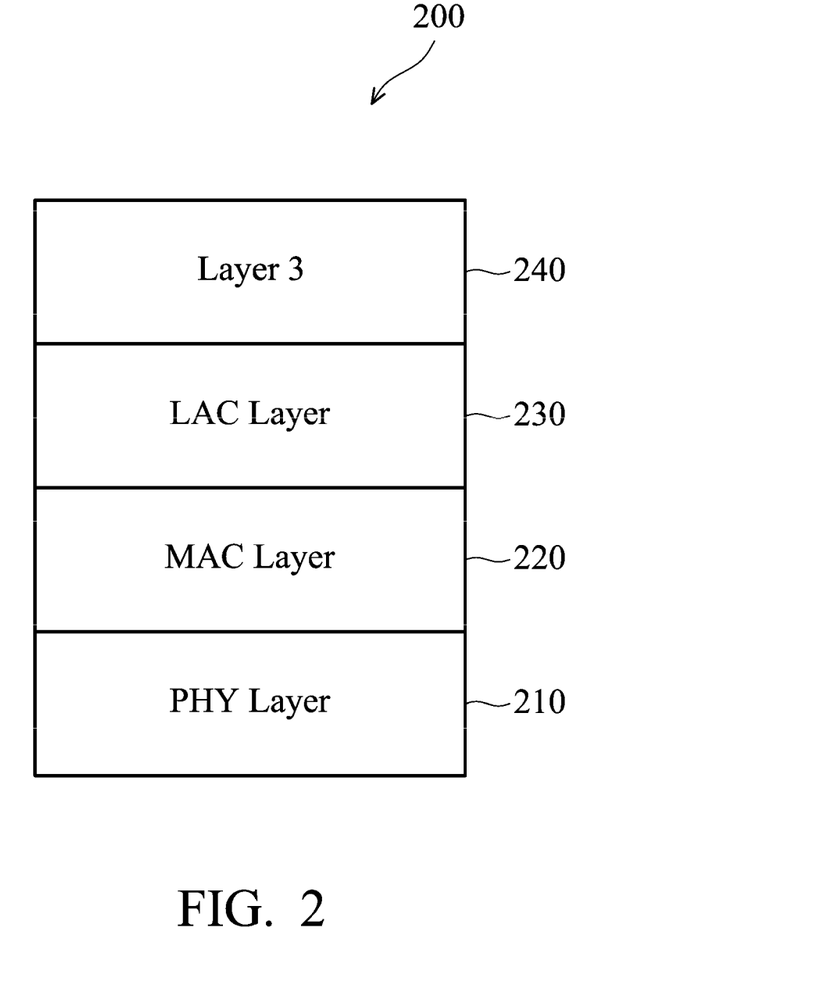
FIG. 2 is a schematic diagram of a protocol stack according to an embodiment of the invention.

FIG. 2 is a schematic diagram of a protocol stack according to an embodiment of the invention. The control module 130 may implement the protocol stack 200 to incorporate with the PHY (physical) layer 210, the MAC (media access control) layer 220, the LAC (link access control) layer 230 and the layer three 240. The protocol stack 200 may be practiced in software instructions, which can be loaded and executed by the digital signal processing unit 125 or/and the control unit 127 of the control module 130 to realize methods for retransmitting reverse link data in accordance with an embodiment of the invention.

Figure 3:
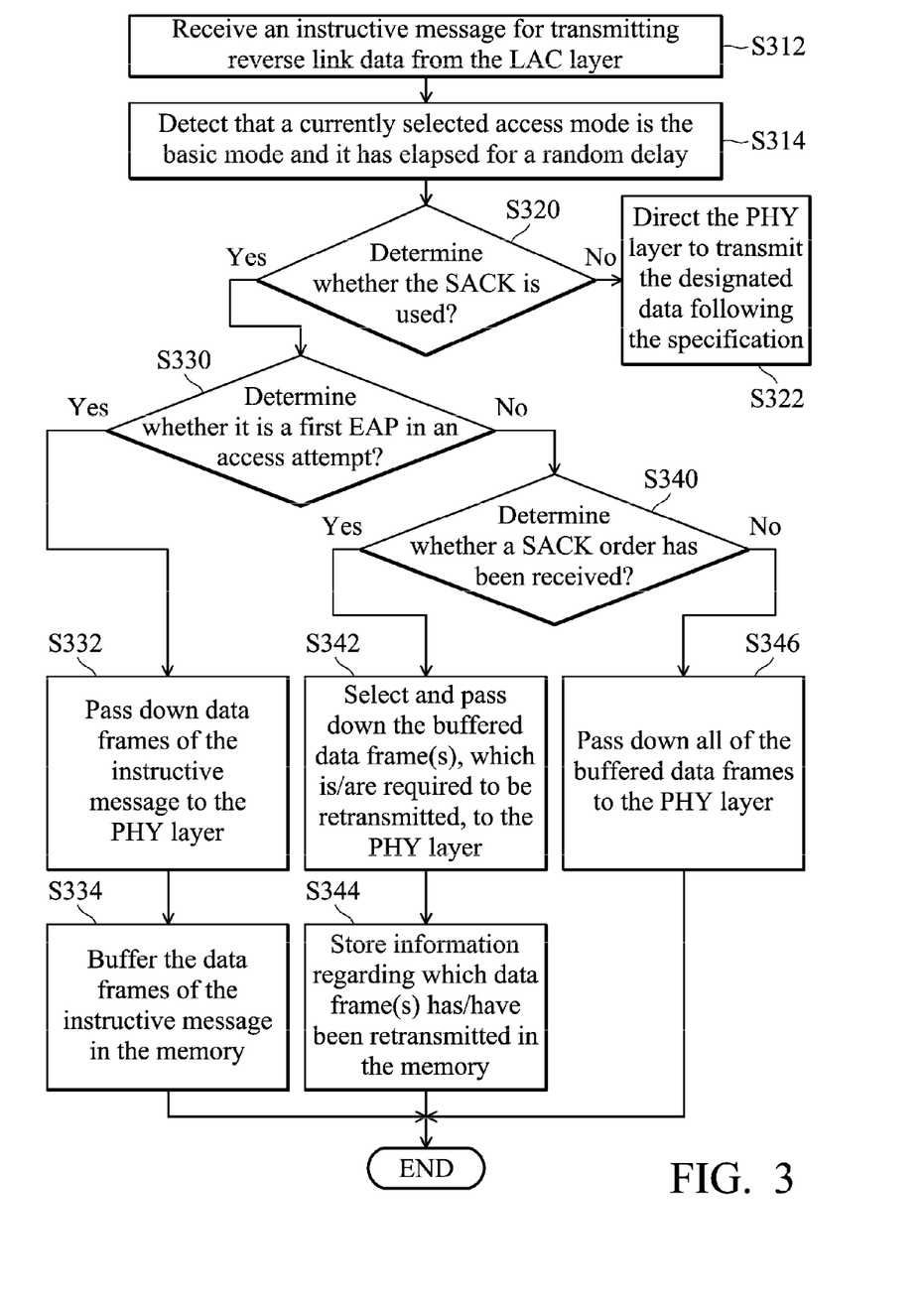
FIG. 3 is a flowchart illustrating a method for retransmitting reverse link data, which is practiced in the MAC layer, according to an embodiment of the invention.

FIG. 3 is a flowchart illustrating a method for retransmitting reverse link data, which is practiced in the MAC layer 220, according to an embodiment of the invention. The control module 130 performs the method for retransmitting reverse link data as follows when loading and executing the software instructions of the MAC layer 220. The MAC layer 220 receives an instructive message for transmitting reverse link data from the LAC layer 230, wherein the instructive message comprises all the data frames of a very first enhanced access probe (step S312), and detects that a currently selected access mode is the basic mode and has elapsed for a random delay which means the accessing procedure is begin (step S314). Information regarding the selected access mode may be achieved by inspecting register settings, or variable values stored in the memory 129. In alternative embodiments, the LAC layer 230 may encapsulate the information regarding the selected access mode into the instructive message for subsequent judging by the MAC layer 220.

After the random delay, it is determined whether the SACK (Selective Acknowledgement) is used (step S320). If not, the PHY layer 210 is directed to transmit the designated data following the specification, which is well known by those skilled in the art (step S322). In step S320, the MAC layer 220 may determine whether the SACK is used by inspecting a register setting, or a particular value stored in the memory 129. In alternative embodiments, the LAC layer 230 may encapsulate information regarding whether the SACK is used into the instructive message for subsequent judging by the MAC layer 220. Whether to make use of the SACK is decided by a telecommunication network, and is broadcast through a PCH (paging channel), which can be got by the subscriber device 120. Information carried in the PCH regarding whether the SACK is used can be comprehended by the layer three 240. In step S322, the MAC layer 220 may use the conventional ACK (acknowledgement) procedure to direct the PHY layer 210 to transmit the designated data, and the ACK procedure is specified in the 3GPP2 ($3^{rd}$ Generation Partnership Project 2) CS0003-e published in June 2010.

After determining that the SACK is used, the "Yes" path of step S320, the MAC layer 220 determines whether it is a first EAP (enhanced access probe) in an access attempt (step S330). In step S330, the MAC layer 220 may inspect the serial number "seqno" of the instructive message received from the LAC layer 230 to achieve the determination, where "0" indicates it is a first EAP in the access attempt, and a value other than "0" indicates it is a retransmitted EAP of the access attempt. If it is a first EAP, the "Yes" path of step S330, data frames of the instructive message including all data frames in the very first access probe are passed down to the PHY layer 210, where the total number of the data frames may be N (step S332), and the data frames of the instructive message are buffered in the memory 129, which means all data frames in the very first access probe are buffered (step S334). The PHY layer 210 drives the requisite hardware, e.g. the RF processing module 123, to transmit an EAP carrying the data frames via the R-EACH (Reverse-enhanced Access Channel) to the telecommunication network through the base station 110 after receiving the data frames. The memory 129 may be a RAM (Random Access Memory) and allocate a buffer region to store the data frames.

After it is determined that the SACK is not used, the "No" path of step S320, it is determined whether a SACK order has been received (step S340). The SACK order is generated by the telecommunication network, which contains information indicating which data frames were successfully decoded, where the data frames were transmitted by one or more EAPs. The layer three 240 is capable of comprehending the SACK order and may notify the MAC layer 220 of whether a SACK order has been received by setting one or more registers (not shown) or storing relevant information in the memory 129. In alternative embodiments, the LAC layer 230 may encapsulate information whether a SACK order has been received, which is notified by the layer three 240, into the instructive message for subsequent judging by the MAC layer 220.

After it is determined that a SACK order has been received, the "Yes" path of step S340, the buffered data frame(s) that are required to be retransmitted are selected and passed down to the PHY layer 210 (step S342), and information regarding which data frame(s) have been retransmitted is stored in the memory 129 (step S344). The PHY layer 210 drives requisite hardware, e.g. the RF processing module 123 to transmit an EAP carrying the data frame(s) that are required to be retransmitted, by using the R-EACH to the telecommunication network through the base station 110 after receiving the data frames. Additionally, it should be appreciated that the layer three 240 may set one or more registers (not shown) or store relevant information in the memory 129 to notify the MAC layer 220 of which data frames have been successfully decoded after comprehending a SACK order. In alternative embodiments, the LAC layer 230 encapsulates information regarding which data frame(s) have been successfully decoded by the telecommunication network, which is notified by the layer three 240, into the instructive message for subsequent judging by the MAC layer 220. In step S342, the MAC layer 220 may store a vector of a bit mask in the memory 129 to indicate which buffered data frame(s) have been successfully decoded by the telecommunications network. For example, a bit n in the vector equaled to "1" indicates that the n-th data frame has been successfully decoded while a bit m in the vector equaled to "0" indicates that the m-th data frame has not been successfully decoded. An exemplary vector "101001" indicates the buffered 0-, 2- and 5-th data frames have been successfully decoded by the telecommunication network. In alternative embodiments of step S342, the MAC layer 220 may further remove the data frame(s) that have been successfully decoded by the telecommunication network from the memory 129, and rearrange the remaining data frames in an order that is in compliance with the retransmission.

Figure 4:
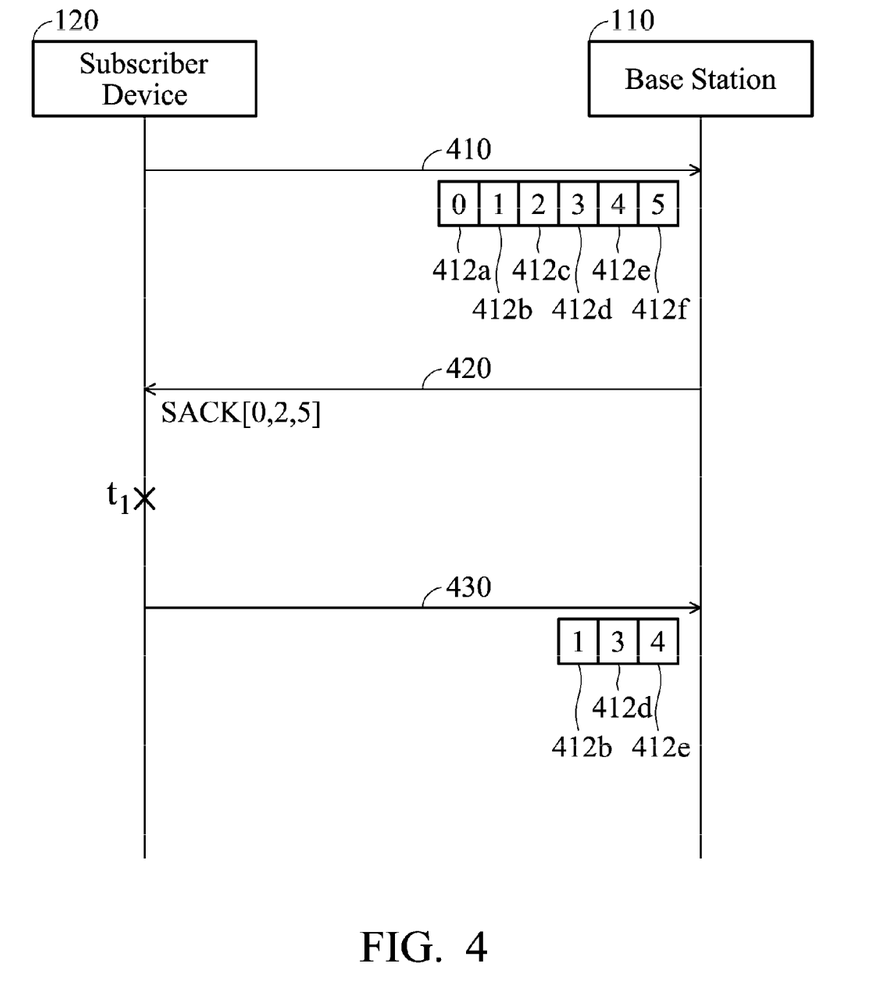
FIG. 4 illustrates a message-exchange diagram in a situation where a SACK order has been received according to an embodiment of the invention.

In order to illustrate steps S342 and S344 precisely, FIG. 4 illustrates a message-exchange diagram in a situation where a SACK order has been received according to an embodiment of the invention. Suppose that $t_1$ is a moment of performing the method as shown in FIG. 3. Before $t_1$, the subscriber device 120 has encapsulated six data frames 412a to 412f into an EAP 410, transmitted the EAP 410 to the base station 110, and received a SACK order 420, which contains information regarding the 0-, 2- and 5-th data frames having been successfully decoded by the telecommunication network. It is to be understood that, when the EAP 410 was transmitted, the MAC layer 220 buffered the six data frames 412a to 412f, reference can be made to description of steps S332 and S334. At $t_1$, the MAC layer 220 passes down the buffered data frames 412b, 412d and 412e, which are required to be retransmitted, to the PHY layer 210 (step S342), thereby enabling the PHY layer 210 to drive the requisite hardware, e.g. the RF processing module 123, to transmit the EAP 430 carrying the data frames 412b, 412d and 412e via the R-EACH to the telecommunication network through the base station 110. Additionally, the MAC layer 220 may further store information about the data frames 412b, 412d and 412e having been retransmitted in the memory 129, reference can be made to description of step S344.

Figure 5:
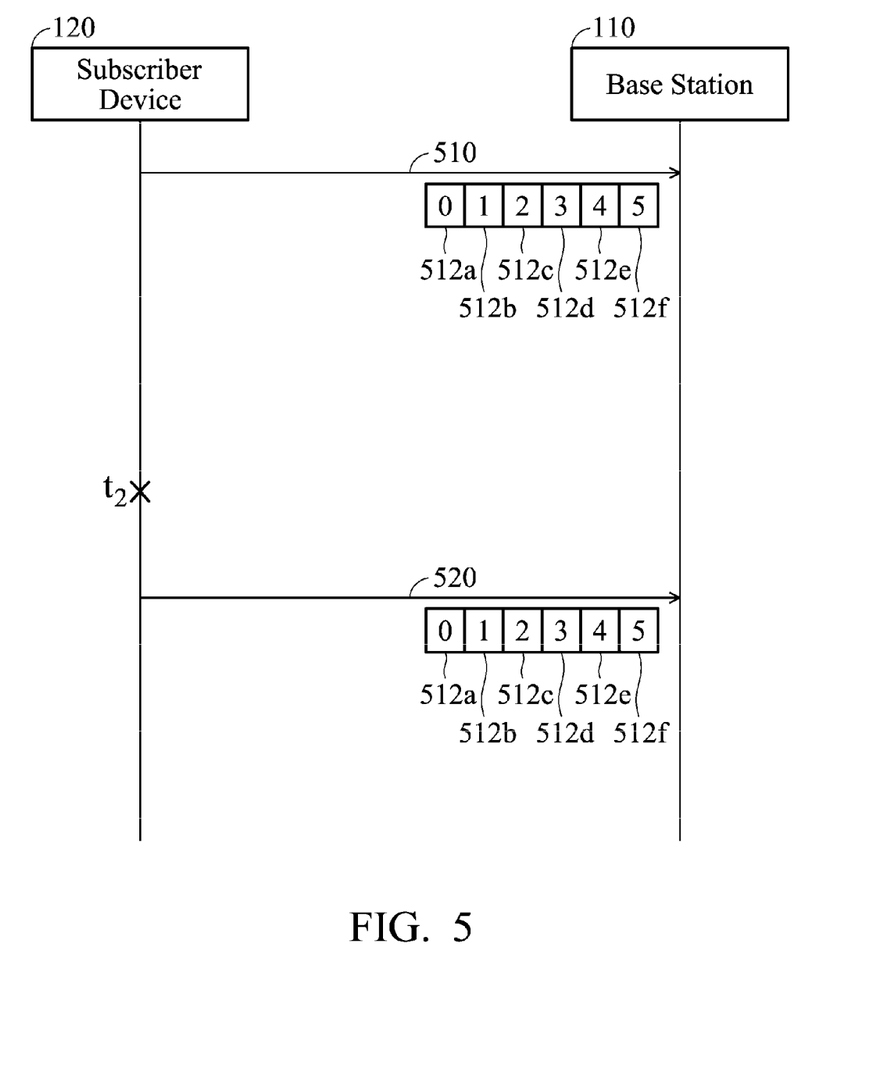
FIG. 5 illustrates a message-exchange diagram in a situation where a SACK order has not been received according to an embodiment of the invention.

After it is determined that a SACK order has not been received, the "No" path of step S340, all of the buffered data frames including all the data frames in the very first access probe are passed down to the PHY layer 210 (step S346). The PHY layer 210 drives the requisite hardware, e.g. the RF processing module 123 to transmit an EAP carrying the retransmitted data frames via the R-EACH to the telecommunication network through the base station 110 after receiving the data frames. In order to illustrate step S346 precisely, FIG. 5 illustrates a message-exchange diagram in a situation where a SACK order has not been received according to an embodiment of the invention. Suppose that $t_2$ is a moment of performing the method as shown in FIG. 3. Before $t_2$, the subscriber device 120 has encapsulated six data frames 512a to 512f into an EAP 510 and transmitted the EAP 510 to the base station 110, but has not received any SACK order. At $t_2$, the MAC layer 220 passes down all the buffered data frames 512a to 512f to the PHY layer 210 (step S346), thereby enabling the PHY layer 210 to drive the requisite hardware, e.g. the RF processing module 123 to transmit the EAP 520 carrying the data frames 512a to 512f via the R-EACH to the telecommunication network through the base station 110.

Although the embodiment has been described by having specific elements in FIG. 1, it is noted that additional elements may be included to achieve better performance without departing from the spirit of the invention. While the process flows described in FIG. 3 includes a number of operations that appear to occur in a specific order, it should be apparent that these processes can include more or fewer operations, which can be executed serially or in parallel ,e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for retransmitting reverse link data practiced by a subscriber device, the method comprising:
   receiving by a media access control (MAC) layer of a plurality of data frames of a first access probe from a link access control (LAC) layer, wherein the LAC layer indicates a selective acknowledgement (SACK) that is included on the plurality of data frames.
   buffering the plurality of data frames by the MAC layer;
   transmitting by a physical layer of the buffered plurality of data frames to a telecommunication network, wherein the transmitted plurality of data frames are encapsulated in a first access probe;
   in response to the transmission of the plurality of data frames, determining whether a SACK order corresponding to the first access probe is received by the MAC from an upper layer of the LAC layer;
   in response to receiving of the SACK order:
      obtaining information regarding the plurality of data frames encapsulated in the first access probe that were successfully decoded by the telecommunication network;
      selecting at least one of the plurality of the buffered data frames that are required to be retransmitted, according to the obtained information, wherein the successfully decoded plurality of data frames are stored in a memory and taken out from the buffered plurality of data frames;
      passing down the selected at least one of the plurality of data frames to the physical layer, to encapsulate the selected at least one of the plurality of selected data frames into a second access probe and transmit the second access probe to the telecommunication network;
      storing the retransmitted at least one of the plurality of selected data frames in the memory;
   in response to non-receiving of the second SACK order:
      passing down all of the buffered plurality of data frames to the physical layer for retransmission to the telecommunication network.

2. The method of claim 1, wherein, the telecommunication network uses selective acknowledgement operation, and the telecommunication network is a CDMA 2000 1x system.

3. The method of claim 1, wherein the information is obtained by inspecting a setting of a register.

4. The method of claim 1, wherein the information is obtained by inspecting a value stored in the memory.

5. The method of claim 1, wherein the SACK is indicated from a message transmitted by the LAC layer.

6. The method of claim 1, further comprising:
in response to non-receiving of a second SACK order corresponding to the second access probe, encapsulating all of the buffered data frames into a third access probe and transmit the third access probe to the telecommunication network.

7. The method of claim 6, wherein the SACK order is comprehended by a layer three, wherein the layer three is the upper layer of the LAC layer.

8. The method of claim 1, wherein the storing of the retransmitted at least one of the plurality of selected data frames includes storing an information regarding which data frames are retransmitted in the memory.

9. The method of claim 1, further comprising:
arranging the stored plurality data frames of the memory in an order that is in compliance with the retransmission.

10. The method of claim 1, further comprising:
when the telecommunication network uses selective acknowledgement, performing the step for obtaining the information.

11. An electronic device, comprising:
an radio frequency processing module; and
a control module coupled to the radio frequency processing module, the control module configured to execute a method for retransmitting reverse link data, wherein the method comprises:
receiving by media access control (MAC) layer of a plurality of data frames of a first access probe from a link access control (LAC) layer, wherein the LAC layer indicates a selective acknowledgement (SACK) that is included on the plurality of data frames;
buffering the plurality of data frames by the MAC layer;
transmitting through a physical (PHY) layer of the buffered plurality of data frames by encapsulating the buffered plurality of data frames in a first access probe;
determining whether a SACK order corresponding to the first access probed is received by the MAC layer from a layer three;
in response to receiving of the SACK order, obtaining information regarding the plurality of data frames encapsulated in the first access probe that were successfully decoded by a base station;
selecting at least one of the plurality of the buffered data frames that are required to be retransmitted, according to the obtained information, wherein the successfully decoded plurality of data frames are stored in a memory and taken out from the buffered plurality of data frames;
passing down the selected at least one of the plurality of data frames to the PHY layer, to encapsulate the selected at least one of the plurality of data frames into a second access probe and enable the PHY layer to drive the radio frequency processing module to transmit the second access probe to the telecommunication network;
in response to non-receiving of the second SACK order, passing down all of the buffered plurality of data frames to the PHY layer for retransmission to the base station.

12. The electronic device of claim 11, wherein the radio frequency processing module transmits the first access probe and the second access probe through Reverse-enhanced Access Channel.

13. The electronic device of claim 11, wherein the information is obtained by inspecting a setting of a register.

14. The electronic device of claim 11, wherein the information is obtained by inspecting a value stored in the memory.

15. The electronic device of claim 11, wherein the SACK is indicated from an instructive message transmitted by the LAC layer to the MAC layer.

16. The electronic device of claim 11, wherein the control module is further configured to:
in response to the non-receiving of a second SACK order corresponding to the second access probe, encapsulating all of the buffered data frames into a third access probe, and enable the PHY layer to drive the radio frequency processing module to transmit the third access probe to the base station.

17. The electronic device of claim 16, wherein the SACK order is comprehended by the layer three, wherein the layer three is an upper layer of the LAC layer.

18. The electronic device of claim 11, wherein the control module is further configured to store an information regarding which data frames are retransmitted in the memory.

19. The electronic device of claim 11, wherein the control module is further configured to:
arrange the stored plurality of data frames of the memory in an order that is in compliance with the retransmission.

20. The electronic device of claim 11, wherein, the telecommunication network uses selective acknowledgement operation, and the telecommunication network is a CDMA 2000 1x system.

* * * * *